United States Patent

Criss

Patent Number: 5,285,534
Date of Patent: Feb. 15, 1994

[54] RECYCLING DEVICE

[76] Inventor: Jeremy F. Criss, 5308 Emerald Dr., Sykesville, Md. 21784

[21] Appl. No.: 952,265

[22] Filed: Sep. 28, 1992

[51] Int. Cl.$^5$ .............................................. E04H 4/00
[52] U.S. Cl. .......................................... 4/449; 4/11.6; 4/475; 4/482
[58] Field of Search ...................... 4/449, 111.1, 111.6, 4/111.5, 474, 475, 482, DIG. 12; 210/218; 137/212, 587

[56] References Cited

U.S. PATENT DOCUMENTS

| | | | |
|---|---|---|---|
| 3,733,67 | 5/1973 | Bennett | 4/111.1 |
| 2,086,969 | 7/1937 | Strelow | 137/587 |
| 4,213,864 | 7/1980 | Asikainen | 4/111.1 |
| 4,254,515 | 3/1981 | Kiyama et al. | 4/449 |
| 4,285,719 | 8/1981 | Criss . | |
| 4,346,002 | 8/1982 | Petzinger | 4/449 |
| 4,347,632 | 9/1982 | Criss . | |
| 4,546,502 | 10/1985 | Lew | 4/449 |
| 4,999,857 | 3/1991 | Mohrman | 4/111.5 |
| 5,005,227 | 4/1991 | White | 4/449 |

*Primary Examiner*—Henry J. Recla
*Assistant Examiner*—Charles R. Eloshway
*Attorney, Agent, or Firm*—Jones, Tullar & Cooper

[57] ABSTRACT

An improved recycling device utilizes a composting container to receive waste materials through vacuum transport from a plurality of toilets and urinals. The composting container includes an upper vacuumized container, a worm chamber, and a liquid drainage bottom container. A plurality of vacuum motors and pumps are utilized to evacuate the vacuumizable container.

10 Claims, 2 Drawing Sheets

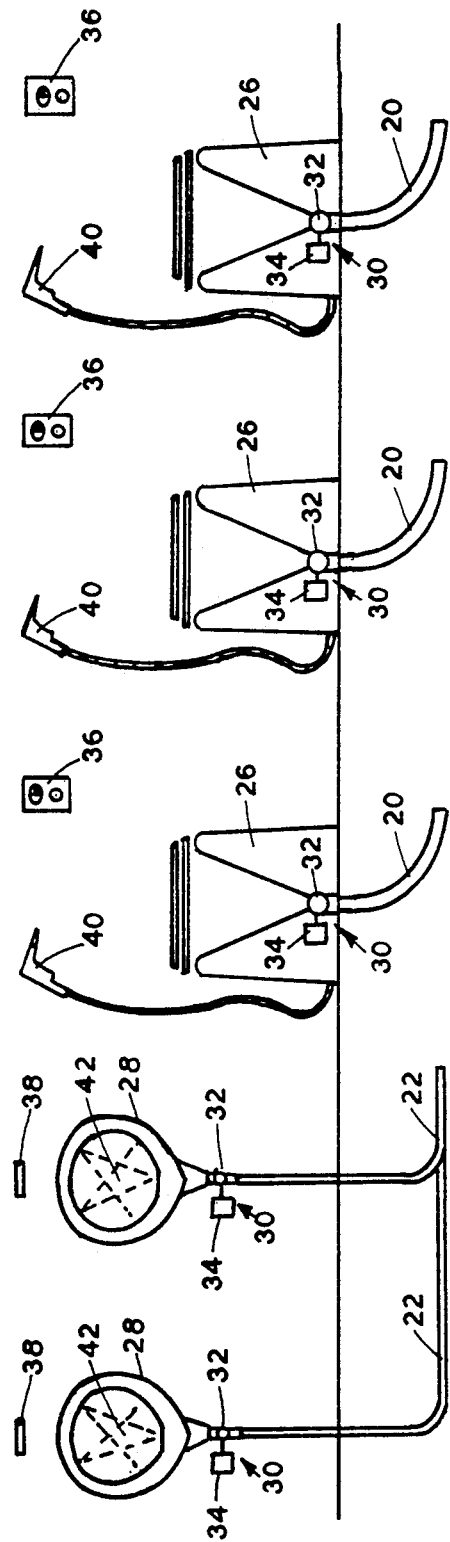
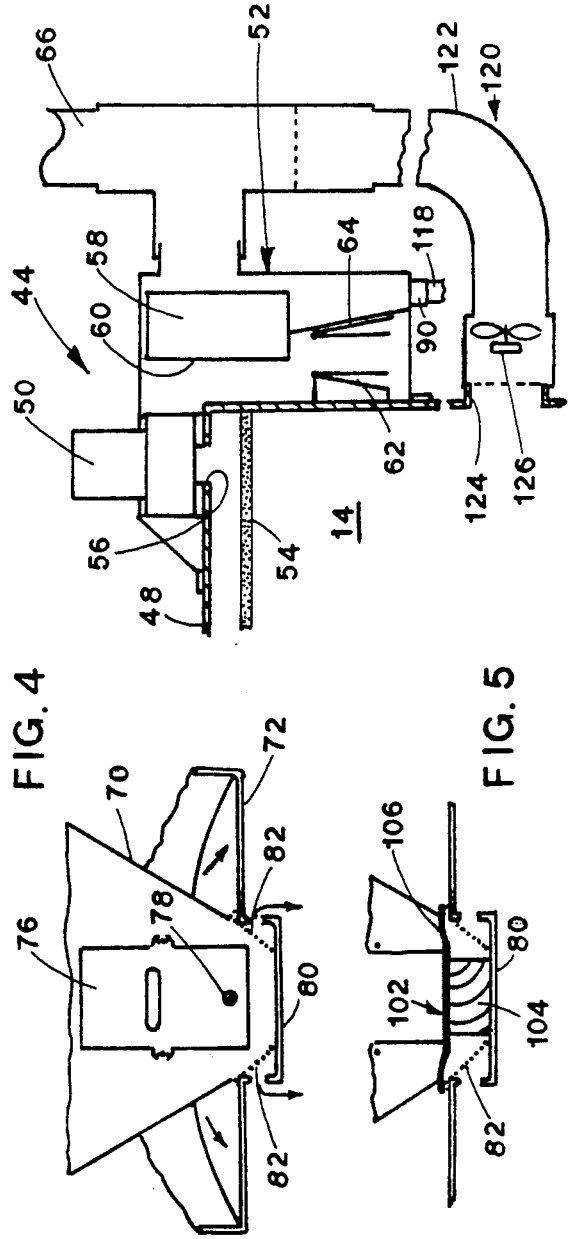
FIG. 2
FIG. 3
FIG. 4
FIG. 5

RECYCLING DEVICE

FIELD OF THE INVENTION

The present invention is directed generally to an improved recycling device. More particularly, the present invention is directed to an improved aerobic recycling device. Most specifically, the present invention is directed to an improved, vacuum transport, aerobic recycling device which is usable in the composting of human and organic materials. Materials deposited in the improved recycling device are subjected to aerobic decomposition through the action of -bacteria and worms. The products of the recycler are worms, worm castings, worm capsules and a non-odorous liquid. The improved recycling device of the present invention is suitable for use in larger, multiple type installations such as public facilities and apartments.

DESCRIPTION OF THE PRIOR ART

Various human and organic waste treatment and disposal devices and procedures, which are alternatives to the generally conventional sewage treatment plants, garbage dumps and landfill facilities are generally known in the art. These various alternative solutions to waste disposal, although having varying degrees of effectiveness, have not enjoyed wide acceptance by the general public. These have either been inefficient, cumbersome, odoriferous, costly, or otherwise objectionable. Accordingly, the vast majority of human and organic wastes have been treated and disposed of by using various procedures which do not truly provide a reusable end product.

In my prior U.S. Pat. Nos. 4,285,719, issued Aug. 25, 1981 and 4,347,632, issued Sep. 7, 1982, I have disclosed and described an organic material recycling method and device which overcomes the limitations and disadvantages of the prior art methods and devices. The disclosures of my two prior patents are incorporated herein by reference. The recycling method and apparatus disclosed in these two prior patents has proved to be quite satisfactory in the aerobic conversion of human liquid and solid wastes, together with organic wastes into a usable compost and fertilizer. Similarly, the recycling device of my prior patented invention has proven satisfactory in residential and single unit usage. However, as with most products, continuing usage and the desire to expand the usage of the device to larger multiple type installations such as public facilities and apartments has pointed up several shortcomings of the prior device.

My prior patented device, which is intended primarily for a single residence, is not intended to be serviced frequently. When the principles of operation of my invention are applied to a larger system, various changes and adaptations become necessary so that the recycling units can handle more toilets and urinals, will be less subject to malfunction due to unintentional or intentional misuse, and will be more easily serviced on a more frequent basis. If the recycler of my prior patents were merely increased in size, the resulting device would become inefficient in terms of vacuum motor size and the like. Thus a mere increase in the size of the prior patented device would not result in a unit that could be adapted for use in multiple unit and public facility installations.

While the organic material recycling method and device set forth in my prior patents has proven to be operationally successful, a need exists for a device which will utilize the technology of the prior invention in large multiple type installations, such as public parks, and apartments. The improved recycling device of the present invention provides such a device and is a significant improvement over the prior art devices.

SUMMARY OF THE INVENTION

It is an object of the present invention to provide an improved recycling device.

Another object of the present invention is to provide an improved aerobic recycling device.

A further object of the present invention is to provide an improved vacuum transport aerobic recycling device.

Yet another object of the present invention is to provide an improved recycling device which is usable in large multiple type installations.

Still a further object of the present invention is to provide an improved recycling device which utilizes multiple motor vacuum pump and assemblies.

Even yet another object of the present invention is to provide an improved recycling device that is easy to service on a frequent basis.

Still yet a further object of the present invention is to provide an improved recycling device which is not susceptible to unintentional or intentional misuse.

As will be discussed in detail in the description of the preferred embodiment which is set forth subsequently, the improved recycling device of the present invention incorporates the basic operating principles and structure of my prior patented devices and provides various modifications and adaptations so that the resulting device is usable in large multiple installations such as public parks and apartments. The large composting tank into which the liquid and solid human wastes, as well as various organic materials are directed provides external worm chamber natural air flow ventilation and external liquid drainage with natural air flow ventilation. This improves the aerobic conditions in the composting chamber and promotes complete decomposition of the materials being composted.

In a large size installation where multiple urinals and toilets are being serviced there are provided a plurality of motors for the pumps which generate the vacuum in the lines between the urinals and toilets and the vacuum portions of the composting chamber. The number of motors used and hence the amount of vacuum generated is dependant on the number of urinals and toilets being used at any given time. This provides flexibility of operation and promotes longer motor and pump life. Additionally, suitable controls are provided to evenly distribute motor wear in public facilities.

A vacuum relief valve is provided on the vacuum chamber portion of the large composting tank. This relief valve will open when the vacuum in the tank exceeds a pre-set limit. The provisions of this vacuum relief valve ensures that the vacuum level in the vacuum tank cannot build up to a high enough level to cause possible collapse of the tank. Thus should one of the vacuum transport lines from one of the urinals or toilets become blocked or plugged, either unintentionally or intentionally, the vacuum relief valve will open and prevent the vacuum level in the tank from increasing to a possibly harmful level.

The improved recycling device of the present invention utilizes improved servicing ports and openings so that the partially composted material can be more easily made accessible to the worms and further so that the fully composted or decomposed material can be removed. Since the improved recycling device is intended for larger scale operations, it is important that the large composting tank can be easily, efficiently and effectively serviced so that the assembly will remain fully operational, even when the servicing is performed by only minimally trained personnel.

The improved recycling device of the present invention incorporates the operating principles of my prior patented method and device into a large scale unit. The changes made to the prior device allow the present device to be commercially usable. The improved recycling device of the present invention is a substantial advance in the art.

BRIEF DESCRIPTION OF THE DRAWINGS

While the novel features of the improved recycling device in accordance with the present invention are set forth with particularity in the appended claims, a full and complete understanding of the invention may be had by referring to the description of the preferred embodiment which is presented subsequently, and as illustrated in the accompanying drawings in which:

FIG. 2 is a front elevational view of a multiple unit bathroom facility using electrically operated valves and controls;

FIG. 3 is a sectional view of a portion of the composting container and showing the vacuum motor housing;

FIG. 4 is a sectional view inside the composting container and showing the unloading hatch for the vacuumized portion of the composting container; and FIG. 5 is a view similar to FIG. 4 and showing the shield assembly used during unloading of the composting container.

DETAILED DESCRIPTION OF THE PREFERRED EMBODIMENT

Figure 1:
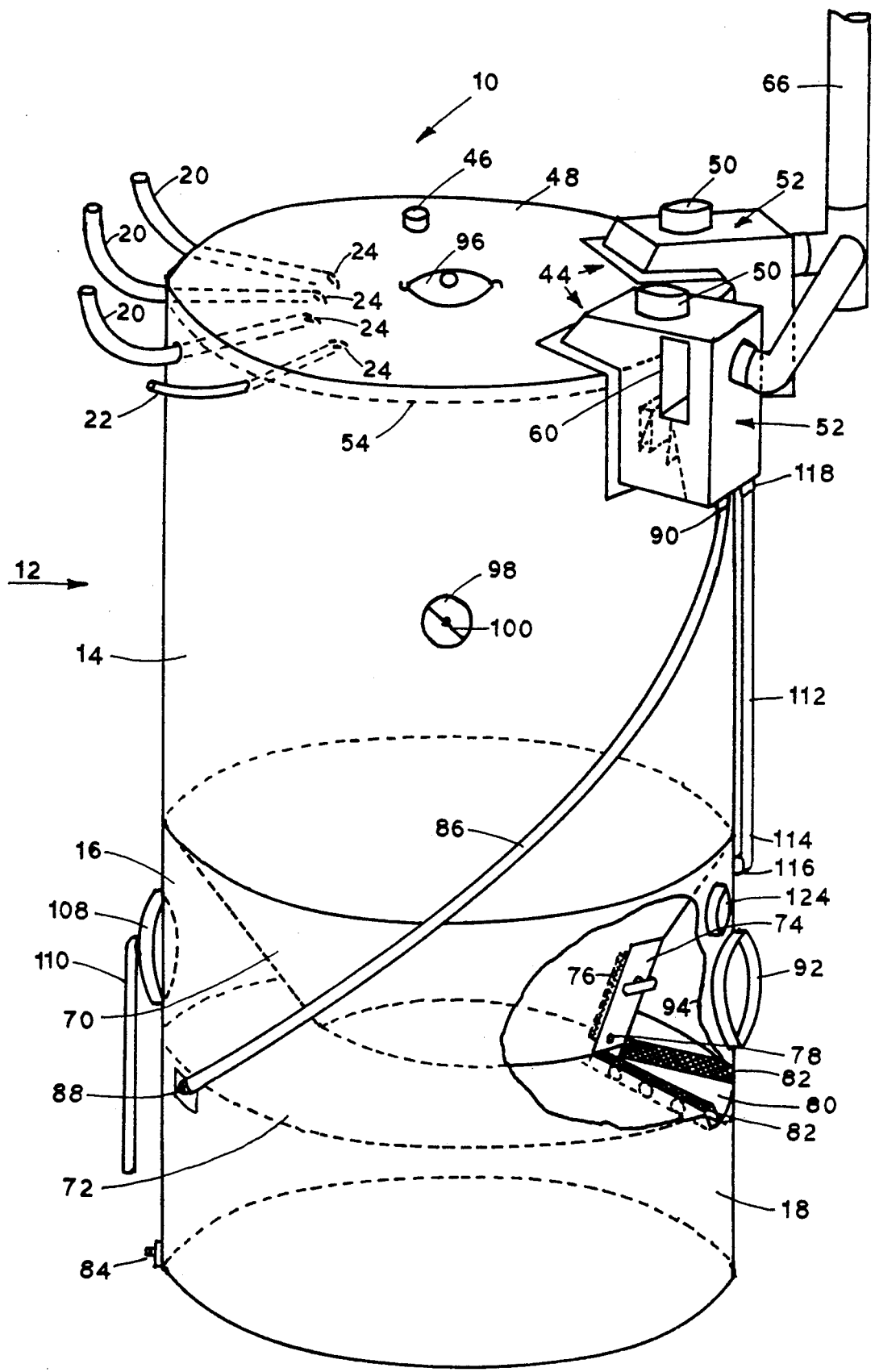
FIG. 1 is a perspective view of a preferred embodiment of the remote processing container of the improved recycling device in accordance with the present invention.

Referring initially to FIG. 1, there may be seen generally at 10 an improved recycling device in accordance with the present invention. Recycling device 10 includes a composting container, generally at 12. The composting container includes an upper vacuumized container portion 14, a lower worm chamber 16, and a liquid drainage bottom container 18. In a preferred embodiment of a commercial improved recycling device, the large composting container 12 may have a capacity in the upper vacuumized container portion 14 of 150 cubic feet and in the liquid drainage bottom container 18 of 300 gallons. In a smaller residential unit, the capacity of the liquid drainage bottom container may have a capacity of 100 gallons and the upper vacuumized container portion may have a similarly reduced volumetric capacity.

A plurality of vacuum toilet lines 20 and vacuum urinal lines 22 extend into an upper portion of the vacuumized portion of the container 12. Each of these vacuum toilet and urinal lines 20 and 22 has a deflector 24 at its terminal end within the vacuumized portion 14 of the container 12. These deflectors 24 may be coated with a material such as Teflon ® so that the solid and liquid materials being pulled into the vacuumized portion 14 of the container 12 will be efficiently broken into small particles by the deflectors 24 but will not stick to, or coat them.

As may be seen most clearly in FIG. 2, these toilet and urinal vacuum transport lines 20 and 22 are connected to suitable toilets 26 and urinals 28. A motorized ball valve assembly 30 is provided at the discharge or drain portion of each toilet 26 and urinal 28. Each such ball valve assembly 30 includes a ball valve 32 and an associated ball valve operating electric motor 34. Each of the toilets 26 is provided with a wall switch 36 and each of the urinals 28 is provided with a wall mounted motion detector 38. Furthermore, each toilet 26 is provided with a suitable hand held liquid spray wand 40 and each of the urinals 28 is provided with a rinse spray valve and outlet array 42. After the toilet 26 has been used and a metered amount of rinse spray has been applied to the interior of the toilet 26 by use of the spray wand 40, the wall switch is actuated. This turns on one of a possible plurality of vacuum motor and pump assemblies generally at 44, as seen in FIG. 1 and as will be discussed in detail subsequently. Actuation of wall switch 36 concurrently causes ball valve motor 34 to open the ball valve 32 against the bias of a ball return spring which is not specifically shown. The solid and liquid waste in the bottom of the toilet 26 will be pulled by vacuum through the vacuum toilet line 20 and into the upper vacuumized portion 14 of the composting container 12. The vacuum transport of the solid materials through the line 20 will be accomplished with sufficient velocity so that the solid materials which strike the deflectors 24 on the tank ends of the vacuum toilet lines 20 will be broken into relatively small particles. In a similar manner, when a urinal 28 has been used, and the user has stepped away, the motion sensor 38 will cause the urinal ball valve motor 34 to open the urinal ball valve 32 and will also actuate the urinal rinse spray array 42 to provide a metered amount of rinse water. At the same time, a selected one of the vacuum motor and pump assemblies 44 in the composting container 12 will be actuated to pull the urine and rinse liquid through the vacuum urinal lines 20 into the vacuumized portion 14 of the container 12. Both the wall switches 36 and the motion sensors 38 include micro switches activated by the opening of the ball valve so that they cannot be misused.

The vacuumized portion 14 of the composting container 12 has an automatic vacuum relief valve 46, as may be seen in FIG. 1. This relief valve will open when the vacuum level in the vacuumized portion 14 of the composting container 12 reaches a pre-set upper limit. Since the vacuumized portion 14 of the container 12 is intended to be placed under vacuum only during toilet or urinal flushing, and further since the flushing of a toilet 26 or a urinal 28 will typically include some air in the vacuum lines 20 or 22, the provision of the relief valve 46 insures that the vacuumized portion 14 of the composting container 12 cannot be over-evacuated, such as might otherwise result because of an inadvertent or malicious blockage of one of the toilet or urinal vacuum lines 20 or 22. These safeguards make the improved recycling device of the present invention much more suitable for large scale commercial or residential use where some of the users may not be particularly careful or respectful of the equipment.

Referring again primarily to FIG. 1, a plurality of individual vacuum motor and pump assemblies, generally at 44, are secured to an upper surface 48 of the composting container 12. Each assembly 44 includes a generally conventional vacuum pump and motor 50 which is contained in a pump and motor housing 52. As may be seen more clearly in FIG. 3, the vacuum pump and motor 50 communicates with the vacuumized portion 14 of the composting container 12. A suitable sponge filter 54 is interposed between an inlet opening 56 to the vacuum pump and motor 50 and the interior of the vacuumized portion 14 of the composting container 12 to insure that liquids and solids do not become pulled into the vacuum pump and motor 50. An activated carbon filter 58 is placed in a filter housing 60 within the vacuum pump and motor housing 52. As may be seen most clearly in FIG. 3, this housing also includes a tank vent flap valve 62 and a vent line flap valve 64. These flap valves 62 and 64 normally provide ventilation for the vacuumized container portion 14. When the vacuum pump and motor 50 is in operation, these flap valves 62 and 64 close so that the vacuumized container portion 14 will be evacuated. The air pulled out of the vacuumized container portion 14 is forced through the carbon filter 58 and up through a roof vent stack 66. As can be seen in FIG. 1, each vacuum pump and motor housing 52 is connected to the roof vent stack 66.

Referring again primarily to FIG. 1, vacuumized container portion 14 of composting container 12 has a lower cone section which tapers inwardly and which has a lower end that abuts a generally planar worm chamber bottom plate 72. A cone unloading hatch 74 is manually removable to allow partially decomposed material from the vacuumized container portion 14 to be pulled out and placed in the worm chamber 16. The cone unloading hatch 74 has an inner stainless steel screen 76 which is spaced slightly away from the inner surface of the hatch 74. A liquid drainage opening 78 is placed in the lower portion of the cone unloading hatch 74 so that liquid pulled into the vacuumized container portion 14 can separate from the solid material. This liquid passes through drainage opening 78 and into a drainage sump 80. Sump 80 is generally trough-shaped and, as may be seen in FIGS. 4 and 5 as well as in FIG. 1, is provided with stainless steel screen plates 82 along its sides. These screen plates 82 allow liquid from the vacuumized container portion 14 to pass down into the liquid drainage bottom container 18. The worm chamber bottom plate 72 is sloped toward the drainage sump as indicated by the arrows in FIG. 4. Thus any liquid in the worm chamber 16 will drain to the sump 80 and then pass through the screen plates 82 into the liquid drainage container 18.

Accumulating liquid in the liquid drainage container 18 can be removed periodically by attachment of a drain hose (not shown) to a drain fitting 84 in the bottom of the liquid drainage container 18. A drainage container vent line 86 connects at a first, lower end to a drainage container vent fitting 88 and passes up to a vent inlet 90 in the vacuum pump and motor housing 52. If desired, the lower end of this vent line 86 can be disconnected from the drainage container vent fitting 88 and the accumulated liquid can be pumped out. The liquid drainage container vent line 86 provides continual flow of exhaust air from the liquid drainage container 18 to the motor housing 52 and thence to the roof vent stack 66.

A front hatch 92 is located in a vertical outer side wall 94 of the worm chamber 16. The level of human and organic materials entering the vacuumized container portion 14 of the composting container 12 of the recycling device of the present invention through the vacuum tubes 20 and 22 and through a top loading hatch 96 in the upper surface 48 of container 12 is monitored by periodic observations through a view port 98 which is provided with a manually operable interior twisting wiper 100. The contents of the vacuumized portion 14 of the container 12 is unloaded by removing the front hatch cover 92 and opening the cone unloading hatch 74, and withdrawing partially processed material for further reduction to finished worm castings in the lower worm chamber 16.

When unloading the cone hatch 74, a temporary unloading device 102 illustrated in FIG. 5, is inserted in the sump area 80 to prevent solid material from clogging the stainless screens 82 which are removable for cleaning. The temporary unloading device 102 is a wood block 104 with a neoprene sheet 106 attached to the top of the wood. The neoprene sheet 106 covers the stainless screens 82. Solid material is pulled from the cone hatch opening with a small hoe and pushed to the left and right around the cone 70 into the worm chamber 16. During the interval between servicing, concentrated colonies of worms in this area work their way from a rear unloading hatch 108 to the front hatch 92, completely consuming all of the unfinished material. This totally rendered end product, worm castings, is periodically removed from the rear hatch 108. As the worms multiply, the castings which are removed from the rear hatch 108 become saturated with worms. Care must be taken to leave an adequate number of worms in the worm chamber 16 of the compost container 12 to continue the process.

The worm chamber is provided with a separate natural air flow ventilation system. An air inlet pipe 110 is attached to the rear hatch 108. A worm chamber vent line 112 is attached to a first lower end 114 to a worm chamber vent line filling 116 and extends up to a second vent inlet 118 in the vacuum pump and motor housing 52. This vent line 112 thus provides air flow from the worm chamber 16 through the motor housing to the roof vent stack 66 at all times. When the vacuum pump and motor 50 is in operation, the pressure of the exhaust air closes the flap valves 62 and 64 thus forcing the exhaust air through the activated carbon filter 58 and then up the roof vent stack 66. The activated carbon filter 58 allows only purified and deodorized vacuum exhaust air to pass to the roof vent stack. When the vacuum motor 50 turns off, the flap valves 62 and 64 return to their open positions and thus provide positive or normal ventilation to formerly vacuumized container portion 14. Ventilating air flow through the vent lines 86 and 112 is continuous. This ventilation air flow prevents the possible accumulation of methane gas in the system.

As may be seen in FIG. 3, an auxiliary ventilating assembly, generally at 120 may be utilized when the cone unloading hatch 74 and the front hatch 92 are open as material is being unloaded into the worm chamber 16. An auxiliary flexible vent duct 122 is attachable to an auxiliary vent fitting 124 in the worm chamber 16. This auxiliary vent duct 122 is connectable to the roof vent stack 66. A small industrial electric fan 126 is placed in the auxiliary vent duct 122 adjacent the vent fitting 124 and helps to ventilate the worm chamber 16 to the roof vent stack 66 when the hatches are open.

While the improved recycling device of the present invention has been depicted with three toilets and two urinals, it will be understood that this is merely illustrative of a number of possible toilets and urinals that could be attached to the composting container 12. Similarly, the vacuumized portions 14 of the composting container 12 has been depicted as having two vacuum motor and pump assemblies. this is again exemplary of the present invention in which the number of vacuum motors and pumps will depend on the number of toilets and urinals being serviced. The group of toilets and urinals will experience varying usage depending on the gender of the users, so a means is provided for periodically switching the groups of bathroom units from one vacuum motor to another with a suitable wall mounted control switch that is not specifically shown to evenly distribute motor wear.

While a preferred embodiment of an improved recycling device in accordance with the present invention has been set forth fully and completely hereinabove, it will be apparent to one of skill in the art that a number of changes in, for example, the materials used in the structure of the tank, the sizes and types of the vacuum pumps and motors, the overall number of toilets and urinals serviced, and the like may be made without departing from the true spirit and scope of the present invention which is accordingly to be limited only by the following claims.

What is claimed is:

1. A recycling device usable to receive and compost solid and liquid human and organic wastes, said recycling device comprising:
   - a composting container, said composting container including an upper vacuumizable container, a worm chamber, and a liquid bottom drainage container;
   - a plurality of vacuum transport lines extending between toilets and urinals and an upper portion of said upper vacuumizable container;
   - a plurality of individually and jointly operable vacuum motor and pump units in said vacuumizable container, said vacuum motor and pump units being operable to evacuate said vacuumized container and said vacuum transport lines, each of said vacuum motor and pump units including a vacuum motor and pump housing, each of said vacuum motor and pump housings being vented to atmosphere through a vent stack;
   - means for allowing discharge of separated liquid waste from said vacuumizable container to said liquid bottom drainage container; and
   - means for ventilating said worm chamber and said liquid bottom drainage container, said means including vent lines, said vent lines extending from said worm chamber and said liquid bottom drainage container to at least one of said vacuum motor and pump housings.

2. The recycling device of claim 1 wherein said at least one of said vacuum motor and pump housings which receives said vent lines includes at least one flap valve, said at least one flap valve being closed when said vacuumizable container is being evacuated.

3. The recycling device of claim 1 further wherein a filter is interposed in said vacuum motor and pump housing between said vacuum motor pump unit and said vent stack.

4. The recycling device of claim 1 wherein said upper vacuumizable container includes a vacuum relief valve.

5. A recycling device usable to receive and compost solid and liquid human and organic wastes, said recycling device comprising:
   - a composting container, said composting container including an upper vacuumizable container, a worm chamber, and a liquid bottom drainage container;
   - a plurality of vacuum transport lines extending between toilets and urinals and an upper portion of said upper vacuumizable container;
   - a plurality of individually and jointly operable vacuum motor and pump units in said vacuumizable container, said vacuum motor and pump units being operable to evacuate said vacuumized container and said vacuum transport lines;
   - means for allowing discharge of separated liquid waste from said vacuumizable container to said liquid bottom drainage container;
   - means for ventilating said worm chamber and said liquid bottom drainage container; and
   - an observation view port in said vacuumizable container.

6. A recycling device usable to receive and compost solid and liquid human and organic wastes, said recycling device comprising:
   - a composting container, said composting container including an upper vacuumizable container, a worm chamber, and a liquid bottom drainage container;
   - a lower cone-shaped portion in said upper vacuumizable container, said cone-shaped portion having a removable cone hatch, said cone hatch having a liquid drain opening;
   - a screen in said cone hatch, said screen preventing solid wastes from entering said liquid drain opening;
   - a plurality of vacuum transport lines extending between toilets and urinals and an upper portion of said upper vacuumizable container;
   - a plurality of individually and jointly operable vacuum motor and pump units in said vacuumizable container, said vacuum motor and pump units being operable to evacuate said vacuumized container and said vacuum transport lines;
   - means for allowing discharge of separated liquid waste from said vacuumizable container to said liquid bottom drainage container; and
   - means for ventilating said worm chamber and said liquid bottom drainage container.

7. The recycling device of claim 6 including a sloping bottom of said worm chamber and further including a liquid drainage sump in said sloping bottom adjacent said cone hatch.

8. The recycling device of claim 7 including screen plates in said sump, said screen plates allowing liquid flow from said said liquid bottom drainage container.

9. The recycling device of claim 8 further including a temporary unloading device positionable atop said liquid drainage sump, said temporary unloading device covering said screen plates and preventing solid material, being unloaded from said cone-shaped portion when said cone hatch is removed, from clogging said screen plates.

10. A recycling device usable to receive and compost solid and liquid human and organic wastes, said recycling device comprising:
   - a composting container, said composting container including an upper vacuumizable container, a worm chamber, and a liquid bottom drainage container;

a plurality of vacuum transport lines extending between toilets and urinals and an upper portion of said upper vacuumizable container;

a plurality of individually and jointly operable vacuum motor and pump units in said vacuumizable container, said vacuum motor and pump units being operable to evacuate said vacuumized container and said vacuum transport lines, each of said vacuum motor and pump units including a vacuum motor and pump housing, each of said vacuum motor and pump housings being vented to atmosphere through a vent stack;

means for allowing discharge of separated liquid waste from said vacuumizable container to said liquid bottom drainage container; and means for ventilating said worm chamber and said liquid bottom drainage container including a flexible vent duct from said worm chamber to said ventstack and an electric fan in said flexible vent duct.

* * * * *